(12) United States Patent
Aknin

(10) Patent No.: US 11,332,005 B2
(45) Date of Patent: May 17, 2022

(54) WHEEL-DRIVE ASSEMBLY

(71) Applicant: REE AUTOMOTIVE LTD., Herzliya (IL)

(72) Inventor: Amit Aknin, Karkom (IL)

(73) Assignee: REE AUTOMOTIVE LTD.

( * ) Notice: Subject to any disclaimer, the term of this patent is extended or adjusted under 35 U.S.C. 154(b) by 0 days.

(21) Appl. No.: 17/529,335

(22) Filed: Nov. 18, 2021

(65) Prior Publication Data
US 2022/0072952 A1 Mar. 10, 2022

Related U.S. Application Data

(63) Continuation of application No. PCT/IB2021/057921, filed on Aug. 30, 2021.

(30) Foreign Application Priority Data

Aug. 31, 2020 (IL) .......................................... 277061

(51) Int. Cl.
*B60K 17/22* (2006.01)
*B60B 27/06* (2006.01)
(Continued)

(52) U.S. Cl.
CPC .......... *B60K 17/22* (2013.01); *B60B 27/0052* (2013.01); *B60B 27/0063* (2013.01);
(Continued)

(58) Field of Classification Search
CPC . B60K 17/22; B60B 27/0052; B60B 27/0063; B60B 27/06; B62D 7/18; F16D 3/16
See application file for complete search history.

(56) References Cited

U.S. PATENT DOCUMENTS

| 2,547,435 A | 4/1951 | Robert |
| 4,300,651 A | 11/1981 | Krude |
| (Continued) | | |

FOREIGN PATENT DOCUMENTS

| JP | 2001233008 A | 8/2001 |
| JP | 3905281 B | 4/2007 |
| KR | 20180043966 A | 5/2018 |

OTHER PUBLICATIONS

Machine Translation for JP2001233008 (Google Patents) published on Aug. 28, 2001.

(Continued)

*Primary Examiner* — Darlene P Condra
(74) *Attorney, Agent, or Firm* — Momentum IP; Marc Van Dyke

(57) ABSTRACT

A wheel drive assembly for transferring propelling torque from a source shaft to a wheel, the source shaft receiving torque from a motion actuator. The wheel drive assembly includes a wheel-hub, adapted to have the wheel mounted thereon, the wheel-hub being arranged about a longitudinal axis, which is adapted to coincide with a rotation axis of the wheel. The wheel drive assembly further includes a drive axle and a constant velocity (CV) joint mounted onto an outer end of the drive axle. The CV joint connects the drive axle to the wheel-hub. An outermost surface of the CV joint is disposed outwardly of an outermost surface of the wheel hub, along the longitudinal axis of the wheel-hub.

25 Claims, 12 Drawing Sheets

(51) Int. Cl.
  *B62D 7/18* (2006.01)
  *B60B 27/00* (2006.01)
  *F16D 3/16* (2006.01)

(52) U.S. Cl.
  CPC ............. *B60B 27/06* (2013.01); *B62D 7/18* (2013.01); *F16D 3/16* (2013.01)

(56) References Cited

U.S. PATENT DOCUMENTS

| | | | |
|---|---|---|---|
| 4,473,129 A | 9/1984 | Guimbretiere | |
| 4,995,633 A * | 2/1991 | Santo | B60G 15/062 280/124.145 |
| 6,880,841 B2 * | 4/2005 | Wang | B60B 27/0094 280/93.512 |
| 8,430,413 B2 * | 4/2013 | Kuwabara | B62K 5/01 280/124.155 |
| 2005/0257971 A1 | 11/2005 | Kakinami et al. | |
| 2006/0290088 A1 * | 12/2006 | Luttinen | B60G 3/265 280/124.145 |
| 2008/0303234 A1 * | 12/2008 | McCann | B60G 3/06 280/124.134 |
| 2014/0378235 A1 * | 12/2014 | Jenkins | F16D 3/06 464/106 |
| 2018/0281853 A1 * | 10/2018 | Gordon | B60G 15/063 |
| 2019/0145465 A1 * | 5/2019 | Olason | B62D 23/005 180/344 |
| 2019/0375287 A1 * | 12/2019 | Verbridge | B60K 7/0007 |

OTHER PUBLICATIONS

Machine Translation for JP3905281 (Google Patents) published on Apr. 18, 2007.
Machine Translation for KR20180043966 (Google Patents) published on May 2, 2018.
International Search Report for PCT/IB2021/057921 dated Dec. 16, 2021.
Written Opinion for PCT/IB2021/057921 dated Dec. 16, 2021.

* cited by examiner

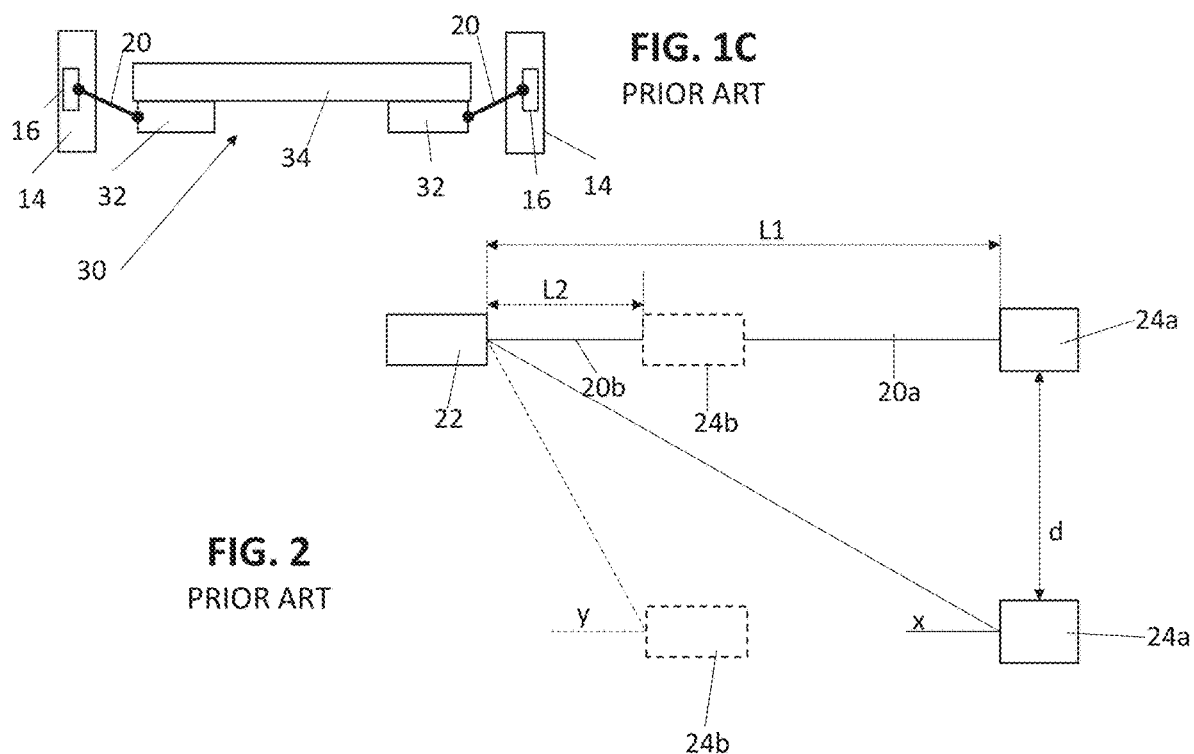

11,332,005 B2

WHEEL-DRIVE ASSEMBLY

CROSS-REFERENCE TO RELATED APPLICATIONS

This patent application is a continuation of PCT/IB2021/057921, filed on Aug. 30, 2021, which is incorporated herein by reference in its entirety. PCT/IB2021/057921 claims priority to Israel Patent Application No. IL277061 filed on Aug. 31, 2020, which is incorporated herein by reference in its entirety.

FIELD OF THE INVENTION

The present invention relates to vehicle wheel drives, and particularly to a wheel-drive assembly that transfers propulsive torque from a source to a vehicle wheel.

BACKGROUND OF THE INVENTION

In most vehicles, propelling torque from a motion actuator, e.g. an electric motor, an engine, or a transmission gear, is transferred to wheels of the vehicle using drive assemblies. Typically, each drive assembly transfers torque from the motion actuator located on the chassis of the vehicle to a wheel on one side of the chassis.

FIGS. 1A and 1B (PRIOR ART) are schematic exploded view illustrations of a typical drive assembly. As seen, a typical drive assembly 10 includes a wheel-hub 12, adapted to have a wheel 14 mounted thereon. Wheel 14 typically includes a tire 16 and a tire rim 18, the tire rim being connected, or connectable, to wheel-hub 12, for example using a plurality of fasteners such as lug nuts.

A drive shaft 19, typically extends under the chassis of a vehicle between the engine and the wheel hub, and typically includes a drive axle 20, which is also known as a half-shaft, functionally associated with a first constant velocity (CV) joint 22 and with a second CV joint 24. First CV joint 22, also known as an inboard CV joint, is functionally associated with an input shaft 26, adapted to connect to an output of the motion actuator, and to receive propelling torque therefrom. Second CV joint 24, also known as an outboard CV joint, is functionally associated with an output shaft 28, which is connected, or connectable, to wheel-hub 12. Consequently, drive axle 20, together with CV joints 22 and 24, transfers torque from the motion actuator to wheel 14, while allowing angular displacement between a rotational axis of the output shaft of the motion actuator and a rotational axis of wheel-hub 12. Such angular displacement may be caused by motion of the wheel in various, non-rotating directions, such as vertical travel of the wheel caused by uneven road surfaces.

US Patent Application Publication 2005/0257971 relates to a motor-driven wheel includes a wheel disc, a wheel hub, a knuckle, a hub bearing, a constant-velocity joint, an in-wheel motor, and a spring. The center of swing of the constant-velocity joint is placed closer to the outside of the vehicle relative to the hub bearing. Since such components of the constant-velocity joint as an inner race, balls and a cage are placed differently in position from the hub bearing, the hub bearing can be reduced in diameter. An outer race of the constant-velocity joint is integrated with the wheel hub into a single part and has an opening facing the outside of the vehicle. Since the opening is large and shallow, the work of installing the cage, balls and inner race and securing them with a snap ring is facilitated.

SUMMARY

According to an aspect of some embodiments of the present invention there is provided a wheel drive assembly for transferring propelling torque from a source shaft to a wheel, the source shaft receiving torque from a motion actuator, the wheel drive assembly including:
a) a wheel-hub, adapted to have the wheel mounted thereon, the wheel-hub being arranged about a longitudinal axis, which is adapted to coincide with a rotation axis of the wheel;
b) a drive axle; and
c) a constant velocity (CV) joint mounted onto an outer end of the drive axle, the CV joint connecting the drive axle to the wheel-hub,
wherein an outermost surface of the CV joint is disposed outwardly of an outermost surface of the wheel hub, along the longitudinal axis of the wheel-hub.

In some embodiments, the drive axle includes a half shaft.
In some embodiments, wherein the CV joint includes a housing and a cage accommodated within the housing. In some embodiments, the wheel-hub includes a seat at an outer side thereof, and wherein the housing engages the seat. In some embodiments, the housing engages the wheel-hub from an outer side of the wheel-hub.

In some embodiments, the housing is separable from the wheel hub. In some embodiments, in use of the CV joint, bearings of the CV joint are adapted rotate about an interior surface of the housing.

In some embodiments, a majority of the CV joint is exposed exteriorly to the wheel hub.

In some embodiments, the wheel-drive assembly further includes an inner CV joint mounted onto an inner end of the drive axle, and adapted to be functionally coupled to the source shaft.

According to another aspect of some embodiments of the present invention there is provided a wheel assembly, including:
a wheel drive assembly as disclosed herein; and
a wheel including a tire and a tire rim, the tire rim mounted onto the wheel-hub,
wherein at least a portion of the CV joint is visible from an outer side of the wheel.

In some embodiments, the wheel assembly further includes a disk brake and caliper, wherein at least a portion of the CV joint is exterior to the disk brake.

In some embodiments, an outermost surface of the cv joint extends outwardly of a central portion of the tire rim. In some embodiments, the outermost surface of the CV joint extends outwardly of the majority of the tire rim. In some embodiments, the outermost surface of the CV joint extends outwardly of the entirety of the tire rim.

In some embodiments, the wheel assembly further includes, or is functionally associated with, a steering assembly adapted to steer the wheel hub about a steering pivot point, wherein the steering pivot point does not coincide with a pivot point of the CV joint.

In some embodiments, when the steering assembly steers the wheel hub at a steering angle $\delta$, the CV joint swings at a swing angle $\gamma$, swing angle $\gamma$ being smaller than steering angle $\delta$. In some embodiments, a ratio between swing angle $\gamma$ and steering angle $\delta$ is not greater than 1:1.5.

According to yet another aspect of some embodiments of the present invention there is provided a vehicle, including:
a chassis;
at least one motion actuator, functionally associated with the chassis, the motion actuator having an output shaft; and at least one wheel assembly as disclosed herein, wherein the wheel drive assembly of the at least one wheel assembly is functionally associated with the output shaft of the motion actuator, as the source shaft, and the at least one wheel assembly is adapted to transfer propelling torque from the at least one motion actuator to the wheel of the at least one wheel assembly.

In some embodiments, the wheel drive assembly further includes an inner CV joint mounted onto an inner end of the drive axle, the inner CV joint being functionally coupled to the output shaft of the motion actuator. In some embodiments, the inner CV joint is disposed at a laterally exterior edge of the chassis. In some embodiments, the inner CV joint is vertically stationary with respect to the chassis, and the outer CV joint is vertically movable with respect to the chassis, within a predetermined angular range of the drive axle relative to the chassis.

In some embodiments, the motion actuator is attached to the chassis, and functions as a sprung mass.

According to a further aspect of some embodiments of the present invention there is provided a vehicle, including:
 a chassis;
 at least one motion actuator, functionally associated with the chassis, the motion actuator having an output shaft; and
 at least one wheel assembly, including:
  a wheel-hub arranged about a longitudinal axis;
  a drive axle;
  a constant velocity (CV) joint mounted onto an outer end of the drive axle, the CV joint connecting the drive axle to the wheel-hub; and
  a wheel including a tire and a tire rim, the tire rim mounted onto the wheel-hub such that the longitudinal axis of the wheel-hub coincides with a rotational axis of the wheel,
 the wheel assembly being functionally associated with the output shaft of the motion actuator, as the source shaft, and the drive axle and CV joint are adapted to transfer propelling torque from the at least one motion actuator to the wheel; and
 a steering assembly, functionally associated with the wheel-hub and adapted to steer the wheel by pivoting the wheel-hub and the wheel about a steering pivot point, wherein the steering pivot point does not coincide with a pivot point of the CV joint.

In some embodiments, when the steering assembly steers the wheel hub at a steering angle δ, the CV joint swings at a swing angle γ, swing angle γ being smaller than steering angle δ.

According to yet a further aspect of some embodiments of the present invention there is provided a vehicle, including:
 a chassis;
 at least one motion actuator, functionally associated with the chassis, the motion actuator having an output shaft; and
 at least one wheel assembly, including:
  a wheel-hub arranged about a longitudinal axis;
  a drive axle;
  a constant velocity (CV) joint mounted onto an outer end of the drive axle, the CV joint connecting the drive axle to the wheel-hub; and
  a wheel including a tire and a tire rim, the tire rim mounted onto the wheel-hub,
 the wheel assembly being functionally associated with the output shaft of the motion actuator, as the source shaft, and the drive axle and CV joint are adapted to transfer propelling torque from the at least one motion actuator to the wheel; and
 a steering assembly, functionally associated with the wheel-hub and adapted to steer the wheel by pivoting the wheel-hub and the wheel about a steering pivot point, wherein the steering pivot point does not coincide with a pivot point of the CV joint, wherein, when the steering assembly steers the wheel hub at a steering angle δ, the CV joint swings at a swing angle γ, swing angle γ being smaller than steering angle δ.

In some embodiments, a ratio between swing angle γ and steering angle δ is not greater than 1:1.5.

In some embodiments, an outermost surface of the CV joint is disposed outwardly of an outermost surface of the wheel hub, along the longitudinal axis of the wheel-hub.

In some embodiments, at least a portion of the CV joint is visible from an outer side of the wheel.

In some embodiments, the wheel drive assembly further includes an inner CV joint mounted onto an inner end of the drive axle, the inner CV joint being functionally coupled to the output shaft of the motion actuator. In some embodiments, the inner CV joint is disposed at a laterally exterior edge of the chassis. In some embodiments, the inner CV joint is vertically stationary with respect to the chassis, and the outer CV joint is vertically movable with respect to the chassis, within a predetermined angular range of the drive axle relative to the chassis.

In some embodiments, the motion actuator is attached to the chassis, and functions as a sprung mass.

According to another aspect of some embodiments of the present invention there is provided a method for enabling transfer of propelling torque from a motion actuator of a vehicle, having an output shaft, to a wheel of the vehicle, using a drive shaft, a the method including:
 fastening an outer CV joint of the drive shaft to an outer side of the wheel-hub;
 connecting an inner CV joint of the drive shaft to the output shaft of the motion actuator; and
 mounting a wheel on the wheel hub,
 wherein, following the fastening, an outermost surface of the CV joint is disposed outwardly of an outermost surface of the wheel hub.

In some embodiments, the mounting of the wheel on the wheel hub occurs prior to the fastening of the outer CV joint.

In some embodiments, the method further includes, prior to the fastening, inserting the outer CV joint into the wheel hub from an exterior side of the wheel hub. In some embodiments, the wheel-hub includes an outer-side seat, and the inserting of the outer CV joint includes accommodating the outer CV joint in the outer-side seat.

In some embodiments, the wheel includes a tire mounted onto a tire rim, and the mounting of the wheel on the wheel hub includes fastening the tire rim to the wheel-hub.

In some embodiments, the outermost surface of the outer CV joint extends outwardly of a central portion of the tire rim. In some embodiments, the outermost surface of the outer CV joint extends outwardly of the majority of the tire rim. In some embodiments, the outermost surface of the outer CV joint extends outwardly of the entirety of the tire rim.

In some embodiments, the connecting of an inner CV joint includes placing the inner CV joint at an exterior edge of a chassis of the vehicle.

Unless otherwise defined, all technical and/or scientific terms used herein have the same meaning as commonly understood by one of ordinary skill in the art to which the invention pertains. In the case of conflict, the specification, including any definitions therein, will take precedence.

As used herein, the terms "comprising", "including", "having" and grammatical variants thereof are to be taken as specifying the stated features, integers, steps or components but do not preclude the addition of one or more additional features, integers, steps, components or groups thereof These terms encompass the terms "consisting of" and "consisting essentially of".

As used herein, the term "or" is a logical operator combining two Boolean input conditions into a Boolean compound condition, such that the compound condition is satisfied if and only if at least one of the two input conditions is satisfied. In other words, if condition C =condition A or condition B, then condition C is not satisfied when both condition A and condition B are not satisfied, but is satisfied in each of the following cases: (i) condition A is satisfied and condition B is not satisfied, (ii) condition A is not satisfied and condition B is satisfied, and (iii) both condition A and condition B are satisfied.

As used herein, the term "inboard" designates a component of an assembly which is at a location or side facing in the direction of the motion actuator (or in the direction of the chassis). Inversely, the term "outboard" designates a component of an assembly which is a t a location or side facing away from the motion actuator, in the direction of the wheel.

As used herein, the terms "inward" and "interior" relate to a location or side of a component facing toward, or being closer to, a longitudinal centerline of a vehicle. Often, components that are further inward, or more interior, face the motion actuator of the vehicle. Inversely, the terms "outward" and "exterior" relate to a location or side of a component facing away from, or being further from, a longitudinal centerline of a vehicle. Often, components that are further outward, or more exterior, face the wheel of the vehicle.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced. In the drawings:

FIG. 1C (PRIOR ART) is a schematic front view representation of a vehicle including prior art wheel drive assemblies, as shown in FIGS. 1A and 1B;

FIG. 2 (PRIOR ART) is a schematic illustration comparing the angular tolerances of drive axles of different lengths;

DETAILED DESCRIPTION OF SOME EMBODIMENTS OF THE INVENTION

The present invention relates to vehicle wheel drives, and particularly to a wheel-drive assembly that transfers propulsive torque from a source to a vehicle wheel.

Technical Aspects Addressed by the Present Invention

In applications such as when using a motor that is located close to the wheel, it is desirable to reduce the distance between the motion actuator, such as a motor or engine, and the wheel. However, even with the reduced distance, there must be sufficient range of motion between the wheel and the chassis, e.g. for vertical travel and/or for steering of the wheel.

One way to reduce the distance between the motion actuator and the wheel, or wheel-hub, is by shortening the length of drive axle 20. As explained herein, this method may be problematic when CV joints 22 and 24 need to compensate for angular movement of the drive axle, caused, for example, by vertical motion of the wheel relative to the chassis.

Figures 1A, 1B:
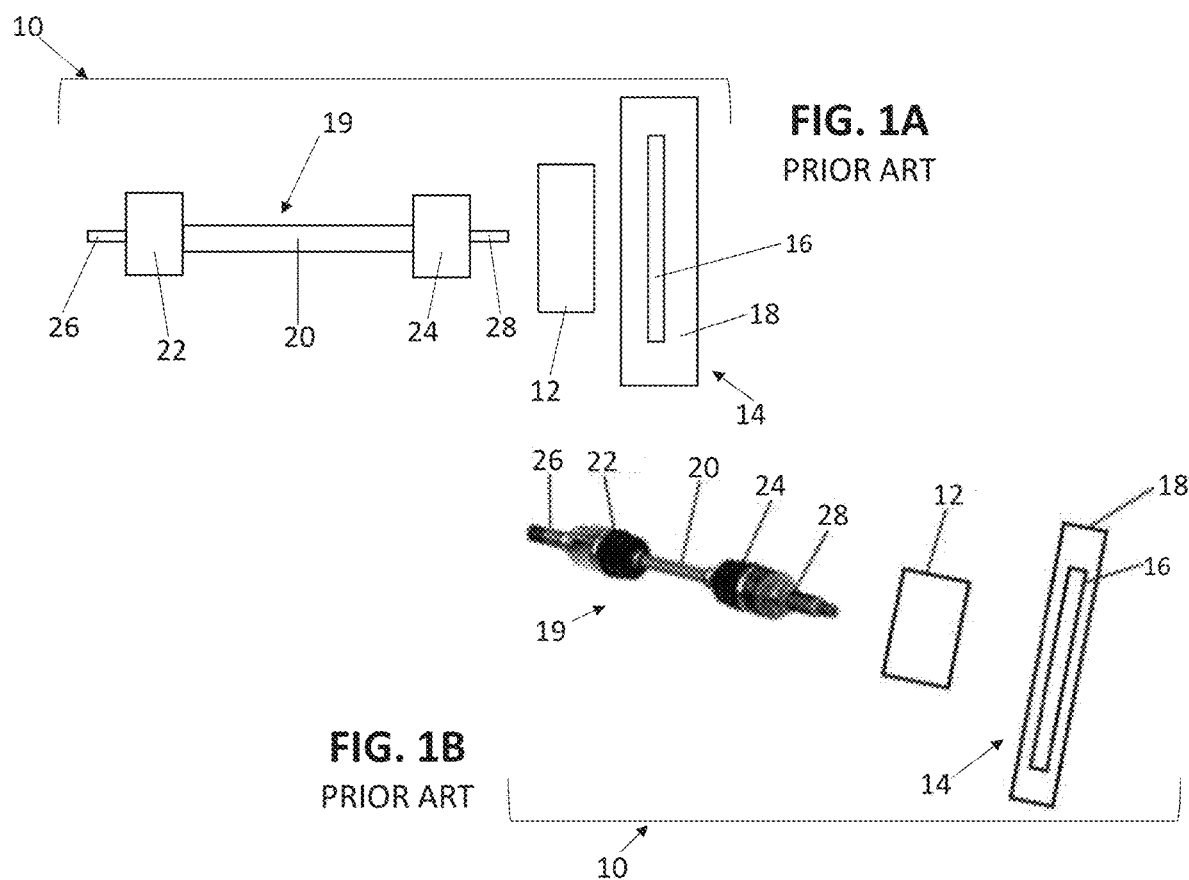
FIGS. 1A and 1B (PRIOR ART) are schematic exploded view illustrations of a typical prior art drive assembly.

Reference is now additionally made to FIG. 1C (PRIOR ART), which is a schematic front view representation of a vehicle including prior art wheel drive assemblies, as shown in FIG. 1A. As seen, in a typical prior art vehicle 30, a powertrain 32 of the motor or engine of the vehicle is located under the chassis 34. Torque is transferred from powertrain 32 to wheel 14 via drive axle 20 and wheel-hub 16. In typical prior art drive assemblies, the second, outboard, the CV joint of drive axle 20 is connected to an inboard side of wheel-hub 16, and does not extend into the wheel hub.

Reference is now additionally made to FIG. 2 (PRIOR ART), which is a schematic illustration comparing the angular tolerances of drive axles of different lengths. In FIG. 2, it is assumed that the motion actuator, e.g. an electric motor, is fixed to the chassis of the vehicle. As such, first (inboard) CV joint 22, which is fixed to the chassis via the motion actuator, is disposed at a fixed height relative to the vehicle platform (chassis).

When there is a disturbance to the wheel, e.g. the wheel goes into a pot hole, the wheel shifts vertically, causing second CV joint 24 to move downward. When the wheel shifts vertically by a distance d, the length of drive axle 20 impacts the angular tolerance required from the second CV joint in order to accommodate for the vertical motion of the wheel.

As seen in FIG. 2, when the drive axle 20a has a first length L1 and the distance between first CV joint 22 and second CV joint 24a is L1, in order to facilitate a vertical motion of the wheel to a distance d, the drive axle must be disposed at an angle of x degrees from the horizontal, which must accommodated by second CV joint 24a. However, when the drive axle 20b is shorter and has a length L2<L1, the distance between first CV joint 22 and second CV joint 24b is L2. In order to facilitate a vertical motion of the wheel to the distance d, the drive axle must be disposed at an angle of y degrees from the horizontal, which must accommodated by second CV joint 24b. Given that distance d is the same in both scenarios, and drive axle 20a is shorter than drive axle 20b, in accordance with basic geometry, e.g. the Pythagorean theorem, y>x. As a result, greater tolerance is required from CV joint 24b than from CV joint 24a.

As such, if the maximal tolerance of the second CV joint is fixed regardless of the length of the drive axle, a longer drive axle allows the wheel-drive assembly to accommodate greater vertical distances traversed by the wheel, than a shorter drive axle. It is possible that a system including a shorter drive axle would not have sufficient tolerance to accommodate the angular shift (y) associated with a specific vertical distance, and thus, that shortening the drive axle would not provide a suitable solution.

There is thus a need in the art for a wheel-drive assembly which has a small distance between the motion actuator and the wheel, while accommodating sufficient range of motion between the wheel and chassis, e.g. for vertical travel and/or for steering of the wheel.

Additionally, the maximal swing angle of a CV joint is typically more limited than a steering angle of the wheel-hub or wheel. Typically, the steering angle of the wheel is dependent on motion of the CV joint, and because the range of the swing angle is typically smaller than the largest theoretical steering angle, in practice, the maximal steering angle is limited by the range of the swing angle.

As such, there is a need in the art for a wheel-drive assembly in which the steering angle is decoupled from the CV joint swing angle. Alternately, there is a need in the art for a wheel-drive assembly in which the range of the CV joint swing angle facilitates a steering angle which is greater than the swing angle.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 3:
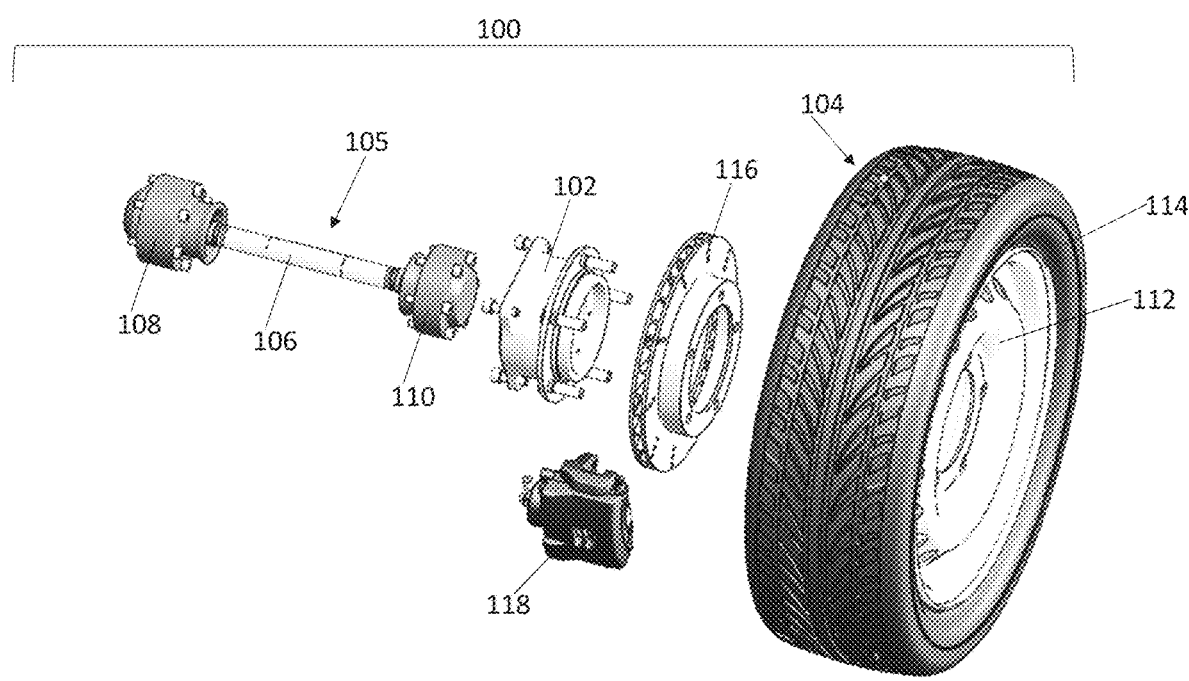
FIG. 3 is an exploded perspective view illustration of a wheel-drive assembly according to embodiments of the disclosed technology.

Reference is now made to FIG. 3, which is an exploded perspective view illustration of a wheel-drive assembly 100 according to embodiments of the disclosed technology. As seen, wheel-drive assembly 100 includes a wheel hub 102, adapted to have a wheel 104 mounted thereon. Wheel-drive assembly 100 further includes a drive shaft 105. Drive shaft 105 includes a drive axle 106, being functionally associated with a first, inboard, CV joint 108, mounted onto an inner end of the drive axle, and with a second, outboard, CV joint 110, mounted onto an outer end of the drive axle. First CV joint 108 is adapted to connect to an output shaft of a motion actuator, and second CV joint 110 is adapted to connect drive axle 106 to wheel-hub 102. Drive shaft 105 is configured to transfer propelling torque from the motion actuator to the wheel.

Wheel 104 may include a tire rim 112 and a tire 114. In some embodiments, a wheel cover (not explicitly shown) attaches to the tire rim to cover up other components of the wheel-drive assembly, such as the wheel-hub and/or the CV joint.

In some embodiments, wheel-drive assembly 100, or a wheel assembly including wheel drive assembly 100, includes wheel-brake components, such as a brake disc 116 and a caliper 118.

In some embodiments, drive shaft 105 may be a standard drive shaft, such as a Rzeppa CV Front Driveshaft commercially available from Teraflex Inc. of Utah, USA. In some embodiments, drive shaft 105 may be a customized or custom-made drive shaft.

Figure 4A:
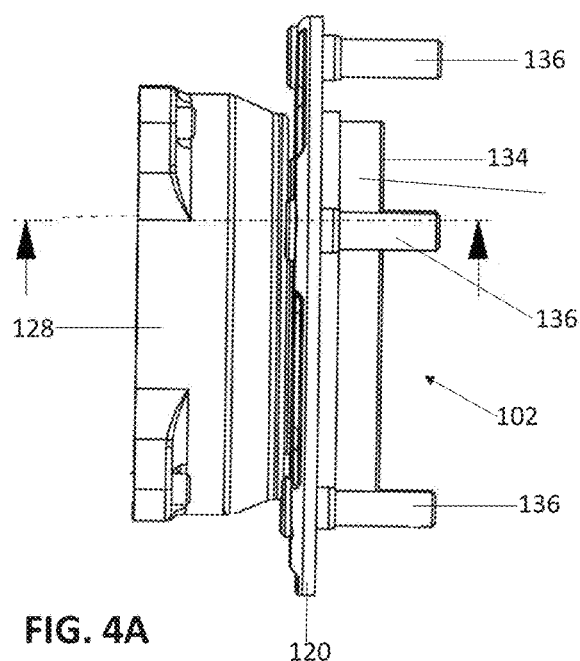
FIGS. 4A and 4B are, respectively, a side view illustration and a cross sectional illustration of a wheel-hub forming part of the wheel-drive assembly of FIG. 4, according to embodiments of the disclosed technology.
Figure 4B:
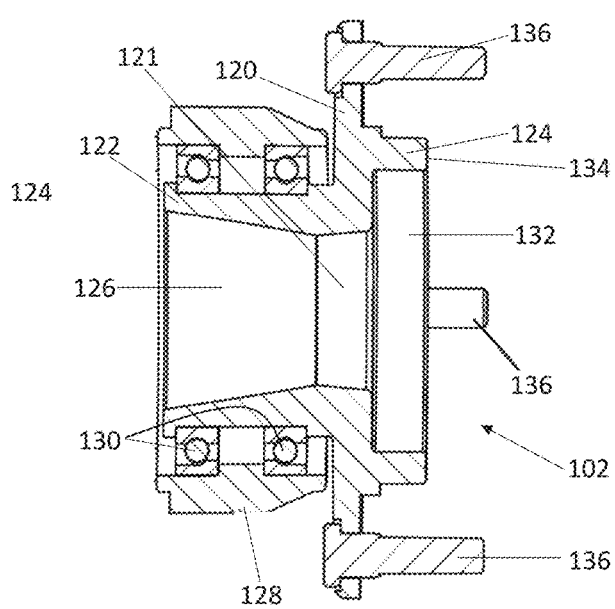

Reference is now made to FIGS. 4A and 4B, which are, respectively, a side view illustration and a cross sectional illustration of an exemplary wheel-hub 102 of wheel-drive assembly 100, according to embodiments of the disclosed technology.

As seen, wheel-hub 102 includes an annular wall 120, defining a bore 121 and having extending therefrom an inner portion 122 and an outer portion 124. Inner portion 122 is generally cylindrical, though a circumscribed bore 126 thereof has a greater diameter at an area distal to wall 120 than at an area proximal to wall 120. A circumscribing ring 128 surrounds inner portion 122, such that ball bearings 130 are disposed between circumscribing ring 128 and inner portion 122.

According to some embodiments, as shown from example in FIGS. 4A and 4B, outer portion 124 is a protruding outer portion which is substantially cylindrical and extends outwardly from annular wall 120. In some embodiments, the diameter of a bore 132 within outer cowl portion 124 is greater than the diameter of bore 121. Consequently, a cavity is formed by an outer surface 120a of wall 120 and surrounding outer cowl portion 124. As explained in further detail hereinbelow, surface 120a defines a seat for a portion of drive shaft 105, disposed within the cavity. Cowl portion 124 terminates in an outward facing surface 134, which is also the outermost surface of wheel-hub 102.

In some embodiments, fasteners 136 may be disposed in wall 120, surrounding bore 121 thereof for engagement between wheel-hub 102 and wheel 104.

Figure 5:
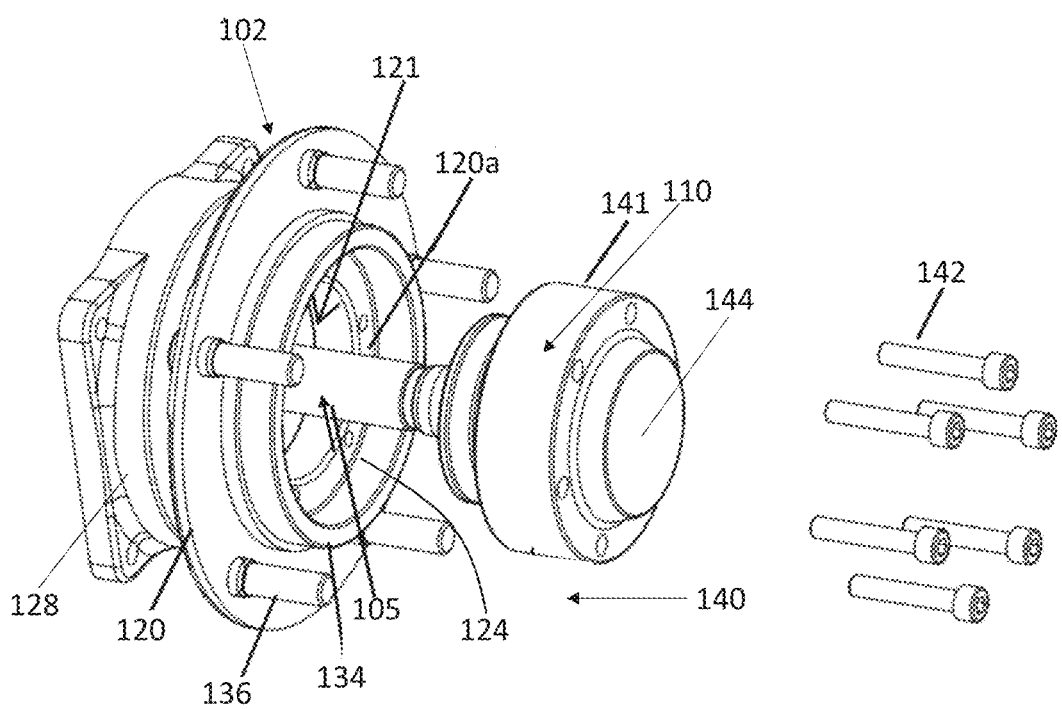
FIG. 5 is a perspective view illustration of a method of connecting components of the wheel-drive assembly of FIG. 3, according to embodiments of the disclosed technology.

Reference is now made to FIG. 5, which is a perspective view illustration of a method of connecting components of wheel-drive assembly 100, according to embodiments of the disclosed technology.

As seen in FIG. 5, drive shaft 105, and more specifically inboard CV joint 108 thereof, is inserted into bore 132 of cowl portion 124 of wheel-hub 102, from an outer side thereof, and is moved toward the interior of wheel-hub 102, e.g. into bores 121 and 126, in the direction of arrow 140. Drive shaft 105 is moved in the direction of arrow 140 until a housing 141 of outboard CV joint 110 is disposed within the cavity of cowl portion 124, and engages the seat defined by surface 120a. Fasteners 142 are used to fasten outboard CV joint 110 to surface 120a of wheel-hub 102.

Figure 6A:
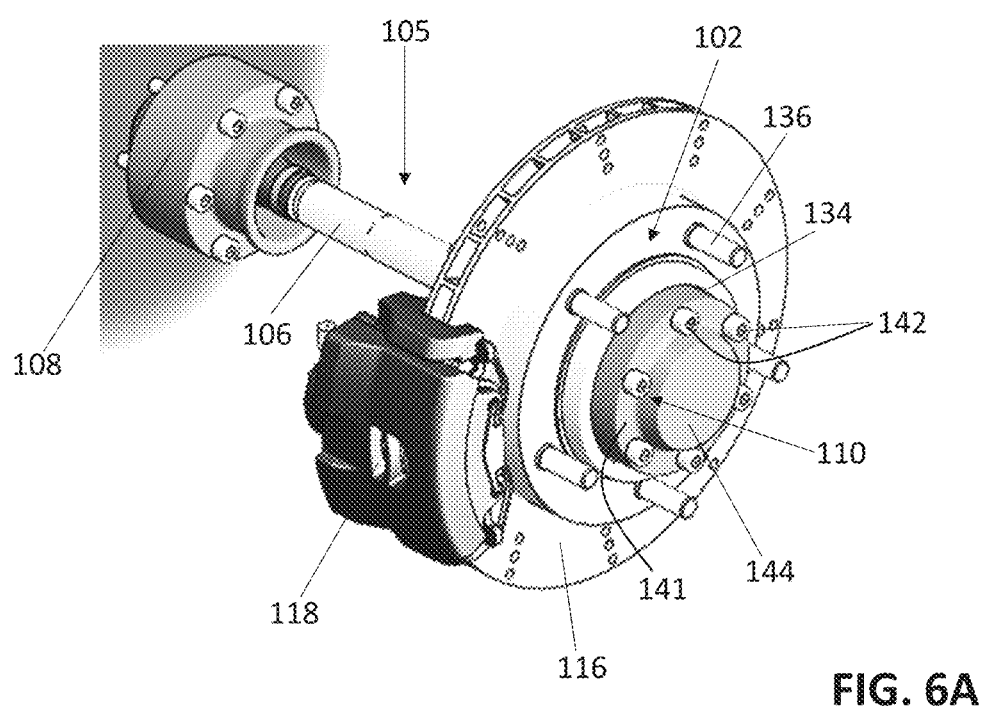
FIGS. 6A and 6B are, respectively, front and back perspective view illustrations of the wheel-drive assembly of FIG. 3 according to embodiments of the disclosed technology, FIG. 6B having a the wheel added thereto.
Figure 6B:
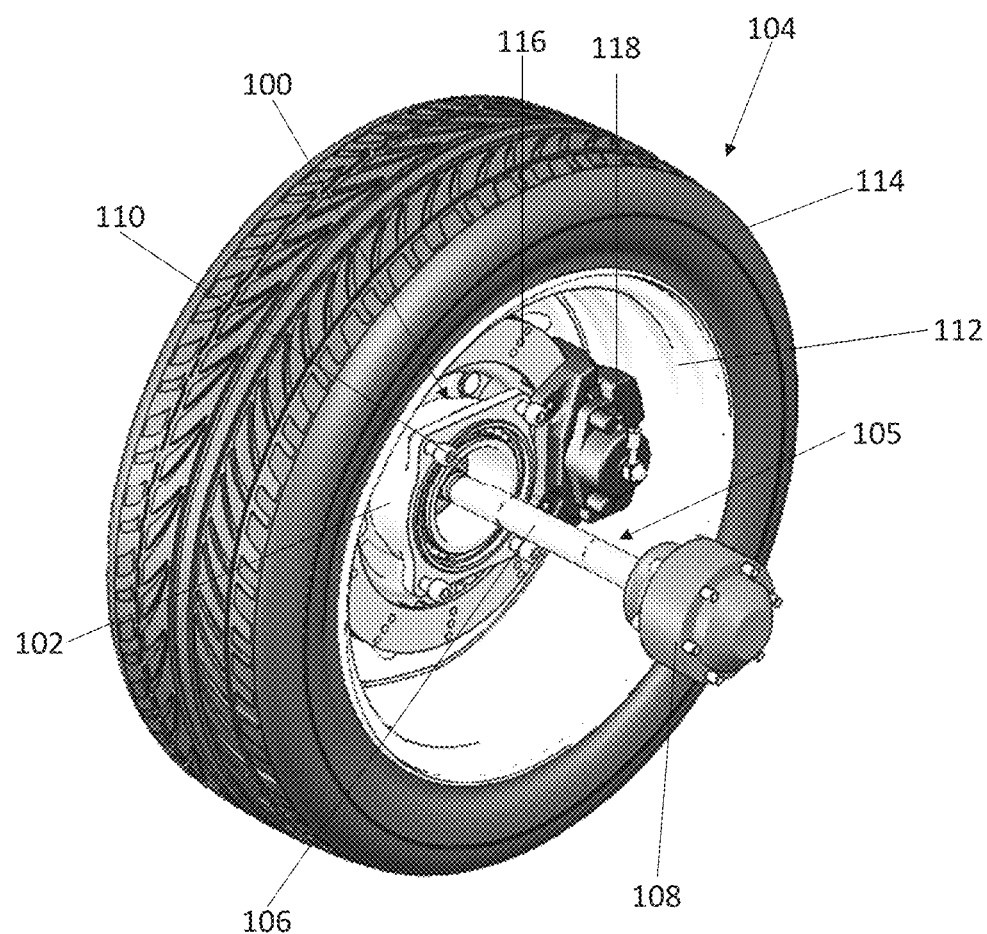

Reference is now additionally made to FIGS. 6A and 6B, which are, respectively, front and back perspective view illustrations of wheel-drive assembly 100 according to embodiments of the disclosed technology, FIG. 6B having wheel 104 added thereto.

As seen, housing 141 of outboard CV joint 110 is disposed within wheel-hub 102, and specifically within cowl portion 124 thereof, such that a portion of the housing, and in some cases a majority of the housing, is exterior to outermost surface 134 of wheel-hub 102. Stated differently, a portion of outboard CV joint 110, and in some embodiments the majority of the outboard CV joint, is exposed laterally outside of wheel-hub 102.

According to some embodiments, for example as shown in FIG. 6A, an outermost surface 144 of housing 141 is disposed outwardly to outermost surface 134 of wheel-hub 102, and as a result is disposed outwardly to the entirety of wheel-hub 102. In this context, fasteners 136 are not considered to form part of wheel-hub 102, but rather are separate components adapted to connect wheel-hub 102 to wheel 104. As seen, drive axle 106 extends through wheel-hub 102, and interiorly beyond the wheel hub, such that inboard CV joint 108 is interior to the entirety of wheel-hub 102.

Additionally, a portion of CV joint 110, and in some embodiments the entirety of CV joint 110, is disposed exterior to disk brake 116, as seen in FIG. 6B.

As described herein, outboard CV joint 110 is fixedly attached to wheel hub 102 by fasteners 142, and as such propelling torque received by drive axle 106, is transferred to wheel-hub 102, and to wheel 104, by CV joint 110.

Figure 7:
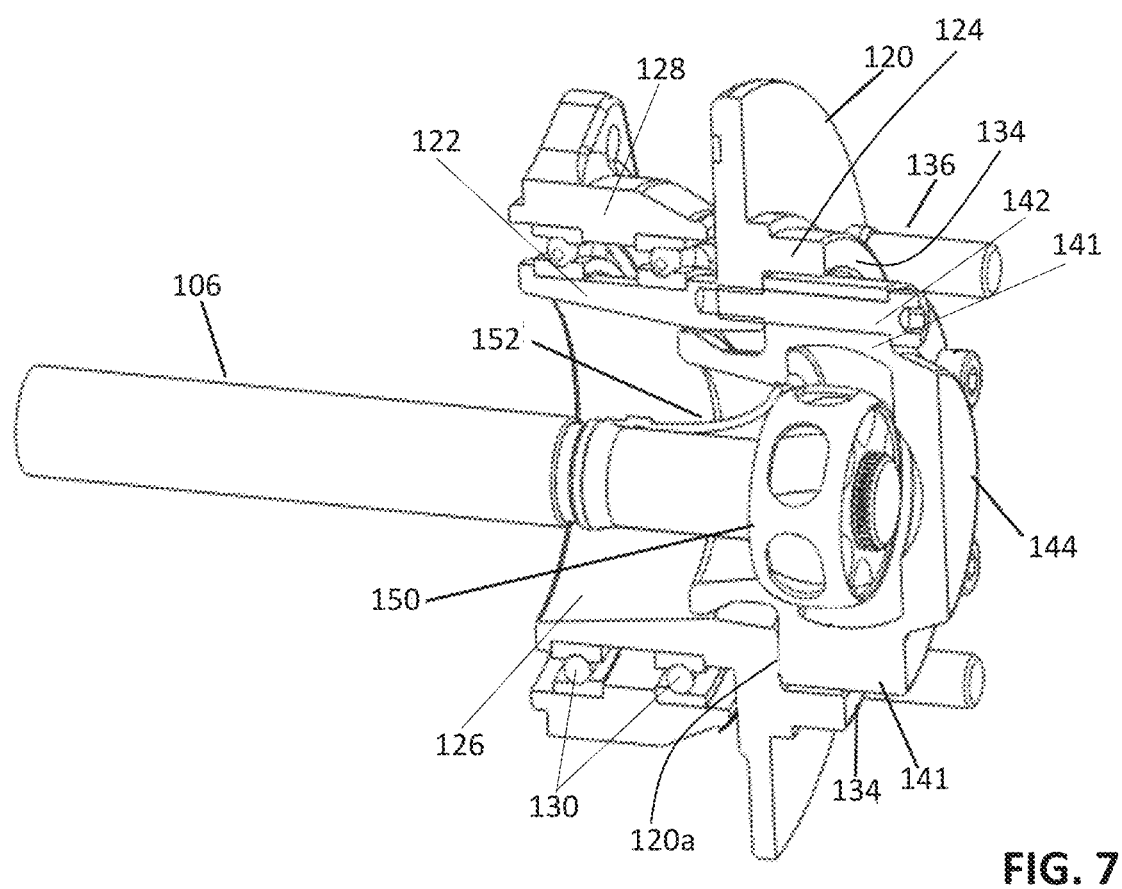
FIG. 7 is a partially cut-away perspective view illustration of the wheel-drive assembly of FIG. 3, the cut-away portion revealing components of a CV joint forming part of the wheel-drive assembly.
Figure 8A:
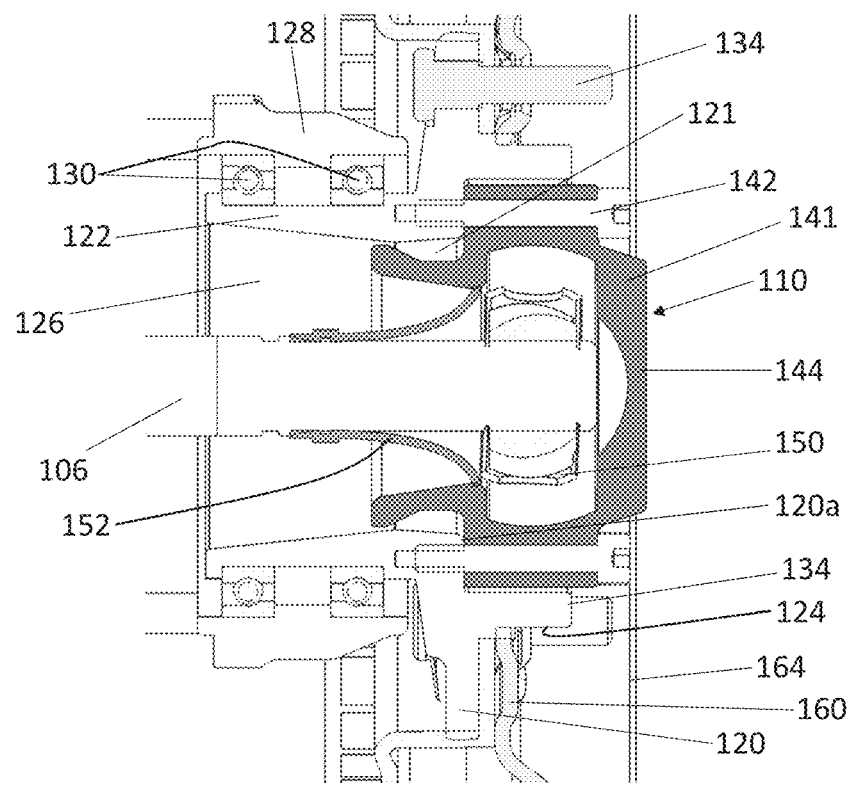
FIGS. 8A and 8B are sectional illustrations of the wheel-drive assembly of FIG. 3, FIG. 8A being a close-up of a central portion of FIG. 8B.
Figure 8B:
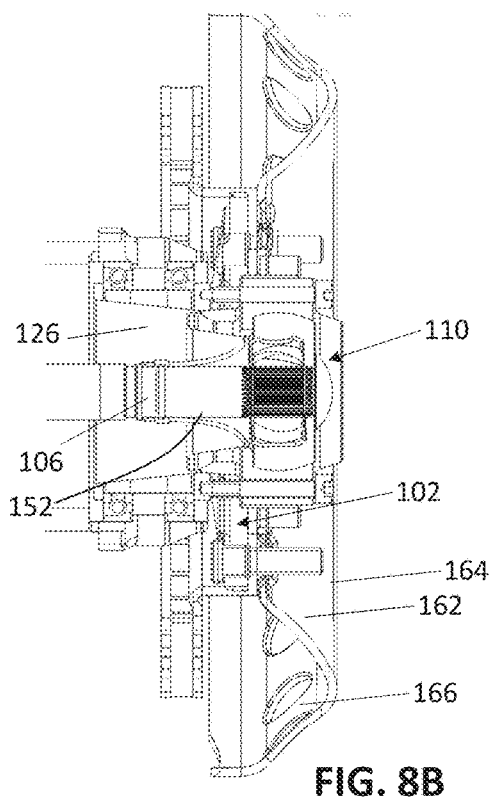

Reference is now made to FIG. 7, which is a partially cut-away perspective view illustration of wheel-drive assembly 100, the cut-away portion revealing components of outboard CV joint 110 of drive shaft 105 of the wheel-drive assembly. Reference is additionally made to FIGS. 8A and 8B, which are sectional illustrations of wheel-drive assembly 100 when connected to wheel 104.

As seen in FIG. 7, outboard CV joint 110 includes housing 141, which is fastened by fasteners 142 to annular wall 120 of wheel-hub 102. A cage 150 of CV joint 110 is disposed within housing 141, and a boot 152 connects cage 150 to drive axle 106 of the drive shaft. Ball bearings of CV joint 110 are adapted to be disposed in cavities of cage 150, and to rotate against an inside surface of housing 141. As seen, there is at least a portion of inner portion 120 of the wheel-hub into which CV joint 110 does not extend, and which is not engaged by CV joint 110. As seen, an inward end of CV joint 110 is disposed laterally outwardly of an inner most surface of inner portion 120 (along the longitudinal axis of the wheel hub).

As seen, housing 141 abuts, and is seated against, surface 120a of annular wall 120, such that a portion of housing 141, and in some cases a majority of housing 141, extends laterally exteriorly to outermost surface 134 of wheel-hub 102. Additionally, a portion of cage 150, and in some cases a majority of cage 150, extends laterally exteriorly to outermost surface 134 of wheel hub 102. As seen in FIGS. 5 and 7, housing 141 of CV joint 110 is separable from wheel-hub 102. In this context, the term "separable" mean that the housing can be separated from the wheel-hub, while maintaining its function as a housing surrounding cage 150.

As mentioned hereinabove, it is a particular feature of some embodiments of the present invention that the CV joint is separable from, and need not be integrated with, the wheel-hub. In some embodiments, this may reduce wear between the wheel-hub and the CV joint, and may ease replacement of the CV joint when it is necessitated by wear of the CV-joint. Additionally, some embodiments of the disclosed technology may use "off the shelf" standard CV joints, and the wheel hub may be designed to accommodate CV joint of different types and/or sizes.

In some embodiments of the disclosed technology, the materials of the wheel-hub and the CV joint are independent of one another, since the wheel-hub does not engage bearings of the CV-joint. Thus, the selection of materials for the wheel-hub and CV joint is not constrained by interaction of CV-joint bearings with the wheel-hub.

In some embodiments of the disclosed technology, the drive shaft may be tested independently of the wheel-hub, or externally to the wheel-hub, for example prior to installing the drive shaft.

Turning to FIG. 8B, it is seen that tire rim 112 includes a central wall portion 160, which is fastened to wheel-hub 102. An angled surface 162 extends radially and longitudinally outwardly from central wall portion 160 to an extremity 164 of the tire rim. A second angled surface 166 extends radially outwardly and longitudinally inwardly from extremity 164 of the tire rim, and is adapted to have the tire mounted thereon.

As seen in FIG. 8A, outermost surface 144 of housing 141 extends laterally outwardly of central portion 160 of tire rim 112. In some embodiments, such as the illustrated embodiment, outermost surface 144 extends outwardly of the majority of tire rim 112 (in a direction along the rotational axis of the tire rim and of the wheel), and in some cases, such as in the illustrated embodiment, extends outwardly of extremity 164, and thus outwardly of the entirety of tire rim 112.

Figure 9:
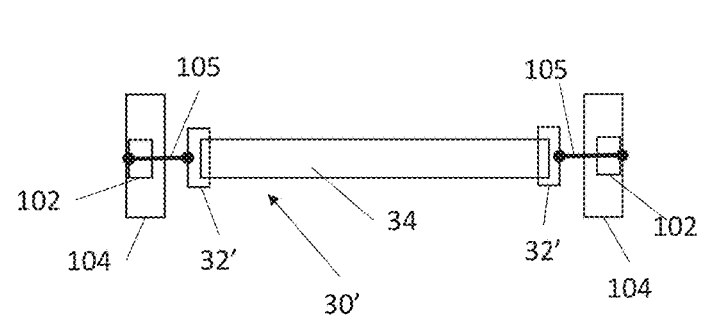
FIG. 9 is schematic front view representation of a vehicle including wheel drive assemblies of FIGS. 3 to 8B, according to embodiments of the disclosed technology.

Reference is now made to FIG. 9, which is a schematic front view representation of a vehicle including wheel drive assemblies 100, according to embodiments of the disclosed technology. FIG. 9 uses reference numerals similar to those of FIG. 1C.

As seen, in a vehicle 30' according to the present invention, a powertrain 32' of the motor or engine of the vehicle is located along an exterior lateral side of the chassis 34, and is fixed thereto. Torque is transferred from powertrain 32' to wheel 104 via drive shaft 105 and wheel-hub 102. As described hereinabove, the outboard CV joint of the drive shaft 105 is disposed exterior to wheel-hub 102, such that the drive axle extends along the length of the wheel-hub. Additionally, the inboard CV joint of the drive shaft 105 is connected to powertrain 32' and as such is disposed at a laterally exterior edge of chassis 34. The inboard CV joint is fixed to the chassis via powertrain 32', and is disposed at a fixed height relative to the chassis.

When there is a disturbance to the wheel, e.g. the wheel goes into a pot hole, the wheel shifts vertically, causing the outboard CV joint to move downward, relative to the chassis, within a predetermined angular range of the drive shaft 105.

The connection of the drive axle to the laterally outward side of the wheel-hub, together with the powertrain being installed on the side of the chassis, allows for a reduced distance between the powertrain and the wheel, while maintaining the angular range of the wheels and of the CV joint, as explained herein.

It is a particular feature of the present invention that the placement of drive shaft 105, and particularly the mounting of outboard CV joint 110 exteriorly of wheel-hub 102, shortens the distance between the wheel-hub and the motion actuator, relative to a setting in which the outboard CV joint is attached to an interior side of the wheel-hub. This in turn shortens the distance between an exterior side of the wheel and the motion actuator, or between the exterior side of the wheel and the center of the chassis.

However, because drive axle 106 is not shorter than in prior art embodiments, and in fact drive shaft 105 may be an off-the-shelf unit, the angular range that the drive shaft must handle is unchanged relative to prior art vehicles using the same drive shaft.

As such, the novel placement of the outboard CV joint, as discussed herein, reduces the distance between the wheel and the center of the chassis, or between the wheel and the motion actuator, while addressing the problem described hereinabove with respect to FIG. 2.

Figure 10A:
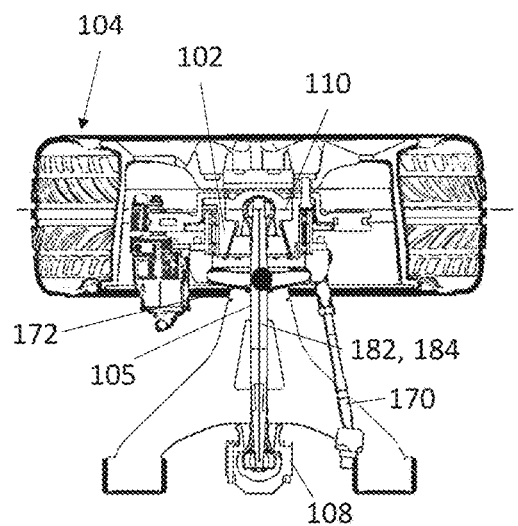
FIGS. 10A and 10B are schematic side view illustrations of a wheel connected to the wheel drive assembly of FIGS. 4 to 8B, in two steering situations.
Figure 10B:
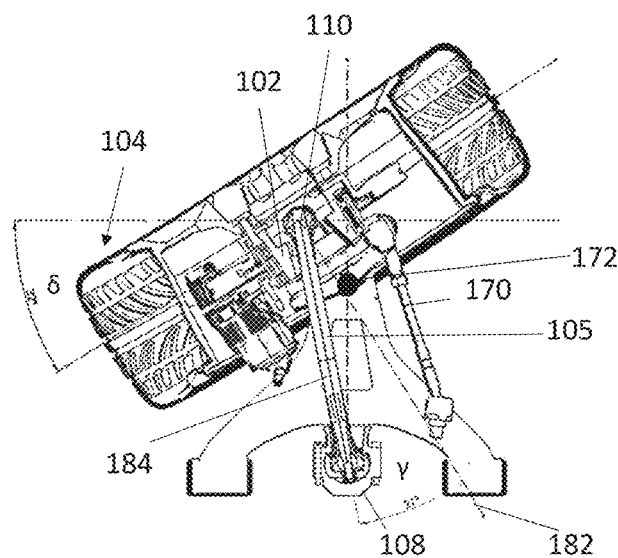

Reference is now made to FIGS. 10A and 10B, which are schematic side view illustrations of a wheel connected to the wheel drive assembly of FIGS. 4 to 8B, in two steering situations.

As seen in FIGS. 10A and 10B, wheel 104 is mounted onto wheel-hub 102. Outboard CV joint 110 of drive shaft 105 is connected to wheel-hub 102, according to the present invention, as described hereinabove. The wheel-hub, or the wheel, is further connected to a steering assembly 170, adapted to steer the wheel-hub and the wheel about a steering pivot point 172. The rotational axis of the wheel is indicated by reference numeral 182.

In the state of FIG. 10A, a longitudinal axis of drive shaft 105 coincides with rotational axis 182.

In FIG. 10B, steering assembly 170 has rotated wheel-hub 102 and wheel 104 by a steering angle δ. Steering of wheel 104 by angle δ is supported by rotation of drive shaft 105 by a swing angle γ. Stated differently, to maintain driving of wheel hub 102 by drive shaft 105, longitudinal axis 184 of drive shaft 105 swings to an angle γ relative to its position in FIG. 10A, and relative to the rotational axis 182 of the wheel.

It is a particular feature of the present invention, that because of the novel placement of CV joint 110 within wheel hub 102, the steering angle δ need not be equal to, and may be larger than, the swing angle γ. In some embodiments, because of the novel placement of CV joint 110 within wheel hub 102, the steering pivot point 172 does not coincide with, and is at a distance from, a pivot point of CV joint 110. The angular difference between steering angle δ and swing angle γ may be due to the distance between the steering pivot point and the pivot point of CV joint 110, and/or due to the difference in placement of the swing axis on which the drive shaft swings, relative to the placement of the steering axis on which the wheel-hub, or wheel, is steered.

In some embodiments, the ratio between swing angle y and steering angle δ is at not greater than 1:1.25, 1:1.5, 1:2, 1:2.5, or 1:3. In some example embodiments, when steering angle δ is about 25-35 deg, the swing angle γ is about 15-25 deg.

Figure 11:
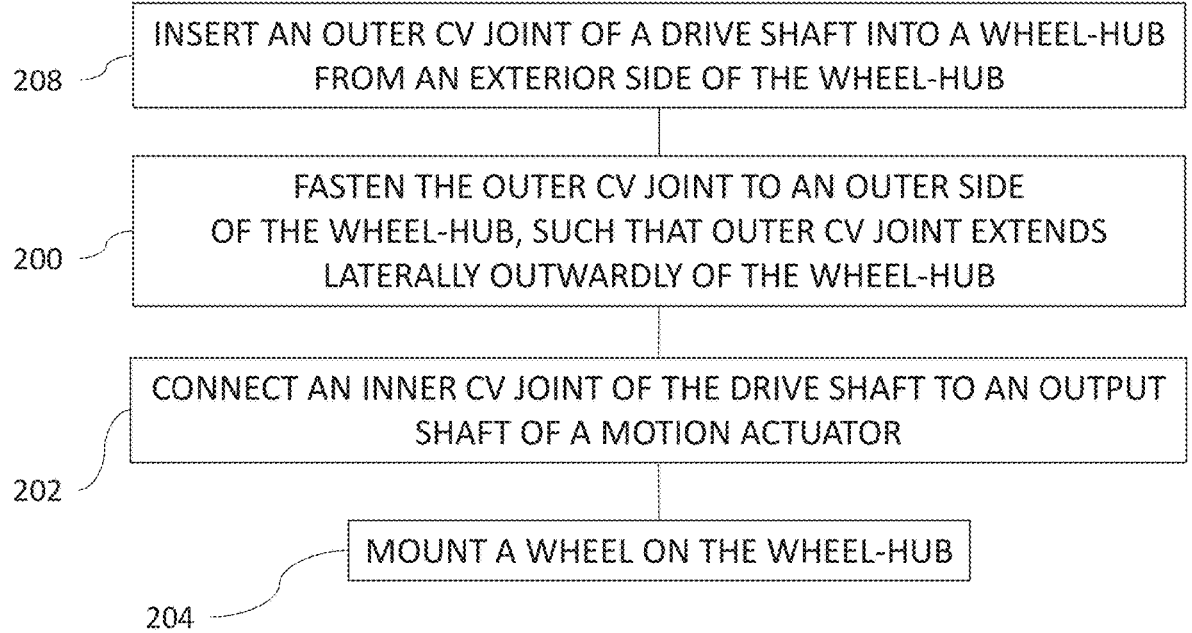
FIG. 11 is a schematic flow chart of a method for transferring propelling torque from a motion actuator of a vehicle to a wheel of a vehicle, using the wheel drive assembly of the disclosed technology, according to some embodiments thereof.

Reference is now made to FIG. 11, which is a schematic flow chart of a method for enabling transfer of propelling torque from a motion actuator of a vehicle to a wheel of a vehicle, using the wheel drive assembly of the disclosed technology, according to some embodiments thereof.

As seen in FIG. 11, at step 200 an outer CV joint, such as CV joint 110 (FIG. 3) of a drive shaft, such as drive shaft 105 (FIG. 3) is fastened to an outer side of a wheel-hub, such as wheel-hub 102 (FIG. 3). Following the fastening, an outermost surface of the outer CV joint is disposed outwardly of an outermost surface of the wheel-hub.

At step 202, an inner CV joint of the drive shaft, such as inner CV joint 108 (FIG. 3) is connected to an output shaft of a motion actuator, such as an output shaft of a motor or drivetrain. In some embodiments, such as the embodiment shown in FIG. 9, connecting of the inner CV joint comprises connecting the inner CV joint to the motion actuator at an exterior edge of a chassis onto which the motion actuator is fixed.

At step 204, a wheel is mounted onto the wheel hub. As such, when the motion actuator is operated, the drive shaft 105 transfers propelling torque from the motion actuator to the wheel-hub and the wheel. In some embodiments, mounting of the wheel comprises fastening the tire rim of the wheel to the wheel hub.

In some embodiments, step 204 occurs prior to step 200 and/or prior to step 202.

In some embodiments, at step 208, which occurs prior to steps 200 and 202, the outer CV joint is inserted into the wheel hub from an exterior side of the wheel hub. In some such embodiments, the inner CV joint is slid into an opening in the wheel-hub, from an outer side of the wheel-hub, and is moved in an inward direction, until the outer CV joint engages a surface of the wheel hub. Specifically, the inner CV joint may be moved until the outer CV joint is accommodated in an outer-side seat of the wheel-hub.

It is expected that during the life of a patent maturing from this application many relevant brake actuators and brake-control-circuits will be developed. The scope of the terms brake actuators and brake-control-circuits are intended to include all such new technologies, a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A wheel assembly, comprising:
a wheel drive assembly for transferring propelling torque from a source shaft to a wheel, the source shaft receiving torque from a motion actuator, the wheel drive assembly comprising:
a) a wheel-hub, adapted to have the wheel mounted thereon, the wheel-hub being arranged about a longitudinal axis, which is adapted to coincide with a rotation axis of the wheel:
b) a drive axle; and
c) a constant velocity (CV) joint mounted onto an outer end of the drive axle, the CV joint connecting the drive axle to the wheel-hub, the CV joint comprising:
a housing, and
a cage, accommodated within the housing, such that the housing surrounds an outer circumference of the cage,
wherein an outermost surface of the housing of the CV joint is disposed outwardly of an outermost surface of the wheel hub, along the longitudinal axis of the wheel-hub; and
the wheel including a tire and a tire rim, the tire rim mounted onto the wheel-hub,
wherein at least a portion of the housing of the CV joint extends outwardly of an outer side of the tire rim, wherein at least one conditional selected from the group consisting of a first condition and a second condition is true, and wherein:
I. according to the first condition, the outermost surface of the housing of the CV joint extends outwardly of a majority of the tire rim: and
II. according to the second condition, the wheel assembly further includes, or is functionally associated with, a steering assembly adapted to steer the wheel-hub about a steering pivot point, wherein the steering pivot point does not coincide with a pivot point of the CV joint, and when the steering assembly steers the wheel hub at a steering angle δ the CV joint swings at a swing angle γ, the swing angle γ being smaller than the steering ange δ.

2. The wheel assembly of claim 1, wherein the wheel-hub includes a seat at an outer side thereof, and wherein the housing engages the seat.

3. The wheel assembly of claim 1, wherein the housing engages the wheel-hub from an outer side of the wheel-hub.

4. The wheel assembly of claim 1, wherein the housing is separable from the wheel hub.

5. The wheel assembly of claim 1, wherein the CV joint further comprises bearings, and, in use of the CV joint, the bearings of the CV joint are adapted to rotate about an interior surface of the housing.

6. The wheel assembly of claim 1, wherein a majority of the housing is exposed exteriorly to the wheel hub.

7. The wheel assembly of claim 1, further comprising an inner CV joint mounted onto an inner end of the drive axle, and adapted to be functionally coupled to the source shaft.

8. The wheel assembly of claim 1, further comprising a disk brake and a caliper, wherein at least a portion of the housing of the CV joint is exterior to the disk brake.

9. The wheel assembly of claim 1, wherein the outermost surface of the housing of the CV joint extends outwardly of a central portion of the tire rim.

10. The wheel assembly of claim 1, wherein at least the first condition is true.

11. The wheel assembly of claim 1, wherein at least the second condition is true.

12. The wheel assembly of claim 11, wherein a ratio between the swing angle γ and the steering angle δ is not greater than 1:1.5.

13. A vehicle, comprising:
a chassis;
at least one motion actuator, functionally associated with the chassis, the at least one motion actuator having an output shaft; and
at least one wheel assembly according to claim 1, wherein the wheel drive assembly of the at least one wheel assembly is functionally associated with the output shaft of the at least one motion actuator, as the source shaft, and the at least one wheel assembly is adapted to transfer propelling torque from the at least one motion actuator to the wheel of the at least one wheel assembly.

14. The vehicle of claim 13, wherein the wheel drive assembly of the at least one wheel assembly further comprises an inner CV joint mounted onto an inner end of the drive axle, the inner CV joint being functionally coupled to the output shaft of the at least one motion actuator.

15. The vehicle of claim 14, wherein the inner CV joint is disposed at a laterally exterior edge of the chassis.

16. The vehicle of claim 14, wherein the inner CV joint is vertically stationary with respect to the chassis, and the outer CV joint is vertically movable with respect to the chassis, within a predetermined angular range of the drive axle relative to the chassis.

17. The vehicle of claim 14, wherein the at least one motion actuator is attached to the chassis, and functions as a sprung mass.

18. A vehicle, comprising:
a chassis;
at least one motion actuator, functionally associated with the chassis, the at least one motion actuator having an output shaft; and
at least one wheel assembly, each including:
a wheel-hub arranged about a longitudinal axis;
a drive axle;
a constant velocity (CV) joint mounted onto an outer end of the drive axle, the CV joint connecting the drive axle to the wheel-hub the CV joint comprising:
a housing; and
a cage, accommodated within the housing, such that the housing surrounds an outer circumference of the cage; and
a wheel including a tire and a tire rim, the tire rim mounted onto the wheel- hub such that the longitudinal axis of the wheel-hub coincides with a rotational axis of the wheel,
the at least one wheel assembly being functionally associated with the output shaft of the at least one motion actuator, as the source shaft, and the drive axle and CV joint are adapted to transfer propelling torque from the at least one motion actuator to the wheel; and
a steering assembly, functionally associated with the wheel-hub and adapted to steer the wheel by pivoting the wheel-hub and the wheel about a steering pivot point, wherein the steering pivot point does not coincide with a pivot point of the CV joint,
wherein at least one condition selected from the group consisting of a first condition, a second condition, a third condition, and a fourth condition, is true, and wherein:
I. according to the first condition, when the steering assembly steers the wheel hub at a steering angle δ, the CV joint swings at a swing angle of γ, the swing angle γ being smaller than the steering angle δ:
II. according to the second condition, an outermost surface of the housing of the CV joint is disposed outwardly of an outermost surface of the wheel hub, along the longitudinal axis of the wheel-hub;
III. according to the third condition, the at least one wheel assembly further comprises an inner CV joint mounted onto an inner end of the drive axle, the inner CV join being functionally coupled to the output shaft of the at least one motion actuator, and the inner CV joint is disposed at a laterally exterior edge of teh chassis; and
IV. according to the fourth condition, the at least one wheel assembly includes the inner CV joint mounted on to the inner end of the drive axle, the inner CV joint being functionally coupled to the output shaft of the at least one motion actuator, the inner CV joint is vertically stationary with respect to the chassis, and the outer CV joint is veritcally movable with respcect to the chassis, within a predetermined angular range of the drive axle relative to the chassis.

19. The vehicle of claim 18, wherein at least the first condition is true.

20. The vehicle of claim 19, wherein a ration between the swing angle γ and the steering angle δ is not greater than 1:1.5.

21. The vehicle of claim 18, wherein at least the second condition is true.

22. The vehicle of claim 18, wherein at least a portion of the CV joint is visible from an outer side of the wheel.

23. The vehicle of claim 18, wherein at least the third condition is true.

24. The vehicle of claim 18, wherein at least the fourth condition is true.

25. The vehicle of claim 18, wherein the at least one motion actuator is attached to the chassis, and functions as a sprung mass.

* * * * *